United States Patent
Ling et al.

(10) Patent No.: US 7,580,924 B1
(45) Date of Patent: Aug. 25, 2009

(54) METHOD AND SYSTEM FOR COLLECTION, ANALYSIS, AND DISPLAY OF SEMICONDUCTOR MANUFACTURING INFORMATION

(75) Inventors: Christopher Lanseng Ling, Palo Alto, CA (US); Michael Leonard Simmons, Monte Sereno, CA (US); Noel John Manicle, Dublin (IE); Andrew John Flynn, Kildare (IE)

(73) Assignee: Xilinx, Inc., San Jose, CA (US)

( * ) Notice: Subject to any disclaimer, the term of this patent is extended or adjusted under 35 U.S.C. 154(b) by 261 days.

(21) Appl. No.: 11/268,833

(22) Filed: Nov. 8, 2005

Related U.S. Application Data

(63) Continuation-in-part of application No. 11/192,344, filed on Jul. 28, 2005.

(51) Int. Cl.
*G06F 17/30* (2006.01)
(52) U.S. Cl. .................................. 707/3; 707/104.1
(58) Field of Classification Search ............... 707/3, 707/104.1
See application file for complete search history.

(56) References Cited

U.S. PATENT DOCUMENTS

| | | | | |
|---|---|---|---|---|
| 5,623,403 | A * | 4/1997 | Highbloom | 705/28 |
| 6,148,307 | A * | 11/2000 | Burdick et al. | 707/104.1 |
| 6,571,232 | B1 * | 5/2003 | Goldberg et al. | 707/2 |
| 7,218,980 | B1 * | 5/2007 | Orshansky et al. | 700/99 |
| 2003/0033287 | A1 * | 2/2003 | Shanahan et al. | 707/3 |
| 2003/0037044 | A1 * | 2/2003 | Boreham et al. | 707/3 |
| 2003/0061200 | A1 * | 3/2003 | Hubert et al. | 707/3 |
| 2003/0061201 | A1 * | 3/2003 | Grefenstette et al. | 707/3 |
| 2003/0208480 | A1 * | 11/2003 | Faulkner et al. | 707/3 |

(Continued)

OTHER PUBLICATIONS

Keith Baker et al.; "Shmoo Plotting: The Black Art of IC Testing"; Proceedings of the International Test Conference (ITC'96) @1996 IEEE; pp. 1-2.
Yield Dynamics; "Genesis Enterprise"; downloaded on Sep. 19, 2005 from http://www.ydyn.com/products/genesis_enterprise.htm; pp. 1-4.
KLA Tencor; "Klarity ACE XP"; downloaded on Sep. 19, 2005 from http://www.kla-tencor.com/j/servlet/ Product?prodID=25&focus=1; pp. 1-4.
U.S. Appl. No. 11/192,344, filed Jul. 28, 2005, Ling et al.

*Primary Examiner*—Don Wong
*Assistant Examiner*—Kim T Nguyen
(74) *Attorney, Agent, or Firm*—Kim Kanzaki; W. Eric Webostad

(57) ABSTRACT

A server system for receiving and processing manufacturing data from a plurality of semi-conductor manufacturers is disclosed. The server system includes: a file capture module for receiving the manufacturing data from the plurality of semi-conductor manufacturers; a format conversion module coupled to the file capture module, the format conversion module converting the manufacturing data to a standard database format for storage in a database; a query builder module coupled to a client web browser for interactively changing contents of the client web browser depending upon a plurality of client selections on the client web browser, the query builder module configured to build a final query based on the plurality of client selections; and a report generation module coupled to the database and the query builder module, the report generation module generating a report based on the final query.

18 Claims, 19 Drawing Sheets

U.S. PATENT DOCUMENTS

| | | | |
|---|---|---|---|
| 2004/0162816 A1* | 8/2004 | Irle et al. | 707/3 |
| 2004/0225649 A1* | 11/2004 | Yeo et al. | 707/3 |
| 2004/0254915 A1* | 12/2004 | Motoyama et al. | 707/3 |
| 2005/0114304 A1* | 5/2005 | White et al. | 707/3 |
| 2005/0114326 A1* | 5/2005 | Smith et al. | 707/3 |
| 2005/0288815 A1* | 12/2005 | Kawahara et al. | 700/121 |
| 2006/0106473 A1* | 5/2006 | Enright et al. | 700/96 |
| 2006/0143244 A1* | 6/2006 | Chia | 707/204 |

* cited by examiner

| Wafer ID | Die Number | Parameter | Data |
|---|---|---|---|
| 1 | 1 | A | 4.1 |
| 1 | 2 | A | 3.2 |
| 1 | 3 | A | 6.2 |
| 1 | 4 | A | 1.1 |

FIG. 5A (Prior Art)

| Wafer ID | Parameter | Data Set (die, data) |
|---|---|---|
| 1 | A | (1, 4.1), (2, 3.2), (3, 6.2) ... |
| 1 | B | .... |
| 2 | A | .... |

FIG. 5B

| WAFER ID 441-1 | PARAMETER 442-1 | DATA SETS 443-1 |
| --- | --- | --- |
| WAFER ID 441-2 | PARAMETER 442-2 | DATA SETS 443-2 |
| ... | ... | ... |
| WAFER ID 441-M | PARAMETER 442-M | DATA SETS 443-M |

DATA STRUCTURE 440

FIG. 5C

| Fab Lot Number 620 | | | Save to Favorite Graphs [          ] [Save] 610 |
|---|---|---|---|
| [          ] [Search] upload lot list | | | Favorite Graphs [-click-▼] ⊙ jump ○ delete |
| Fab 612 | Family 614 | Device 616 | Time Range 618 |
| ☐ check all<br>622 ☐ uncheck all<br>☐ A<br>⊟ B<br>☐ EA<br>☐ EE<br>☐ EF<br>☐ A_EZP<br>☐ AI<br>☐ BD<br>☐ BC<br>☐ HJ | ☐ check all<br>☐ uncheck all<br>☐ 4V ∼ 626<br>☐ 5V<br>☐ CR2<br>☐ QV2<br>☐ S2<br>☐ S2E<br>☐ S3<br>☐ S3E<br>☐ V1<br>☐ V1A<br>☐ V2<br>☐ V2P ∼ 624<br>☐ VA<br>☐ VE<br>☐ VEA<br>☐ VEM<br>☐ XLA<br>☐ XPLA3 | ☐ check all<br>☐ uncheck all<br>☐ 4VFX100<br>☐ 4VFX12<br>☐ 4VFX20<br>☐ 4VFX60<br>☐ 4VLX100<br>☐ 4VLX160<br>☐ 4VLX200<br>☐ 4VLX25<br>☐ 4VLX60   628<br>☐ 4VSX25<br>☐ 4VSX35<br>☐ 4VSX55<br>☐ 4VLX15<br>☐ 4VLX40<br>☐ 4VLX80<br>☐ 95108<br>☐ 95144<br>☐ 95216<br>☐ 9536<br>☐ 9572<br>☐ 2C128<br>☐ 2C256<br>☐ 2C32<br>☐ 2C384<br>☐ 2C512<br>☐ 2C64<br>☐ 2C64A<br>•••<br>☐ V2P20 ∼ 724 | ⊙ yesterday ∼ 619<br>○ last 7 days<br>○ last 30 days<br>○ last 90 days<br>○ last 180 days<br>○ last 365 days<br>○ custom<br>Start Date:<br>[2005 08-22]<br>End Date:<br>[2005 08-24] |

FIG. 8

| | Fab Lot Number 620 | | | 710 |
|---|---|---|---|---|
| | [Search] upload lot list | | Save to Favorite Graphs [   ] [Save] Favorite Graphs [-click-▽] ⊙ jump ○ delete | |
| | Fab 612 | Family 714 | Device 716 | Time Ranges 618 |
| 622 | ☐ check all<br>☐ uncheck all<br>☐ A<br>☑ B<br>☐ EA<br>☐ EE<br>☐ EF<br>☐ A_EZP<br>☐ AI<br>☐ BD<br>☐ BC<br>☐ HJ | ☐ check all<br>☐ uncheck all<br>☐ 4V<br><br><br><br><br><br><br><br><br>(Narrowed) | ☐ check all<br>☐ uncheck all<br>☐ 4VLX25<br>☐ 4VLX60<br>☐ 4VLX15<br>☐ 4VLX200<br>☐ 4VLX160<br>☐ 4VLX100<br>☐ 4VLX40<br>☐ 4VLX80<br><br>(Narrowed) | ⊙ yesterday — 619<br>○ last 7 days — 620<br>○ last 30 days<br>○ last 90 days<br>○ last 180 days<br>○ last 365 days<br>○ custom<br>Start Date:<br>[2005 08-22]<br>End Date:<br>[2005 08-24] |
| | X Axis 640 | Report 642 | Options 644 | |
| 650<br>651<br>652<br>654<br>656 | ○ wafer<br>⊙ lot<br>○ lot-device<br>○ week<br>○ month<br>○ quarter<br>○ fab<br>○ family<br>○ device<br>○ mask<br>○ test program<br>Order by:<br>⊙ Date and Time<br>○ Alpha-Numeric | ○ Progressive Bin Dist.<br>○ Sort Bin Dist.<br>○ Sort Scatterplot<br>○ Sort Parametric<br>○ DO/Wafer Volume<br>○ WAT<br>○ WAT Summary<br>○ WAT Violations<br>○ Wafer Maps<br>○ Shmoo<br>Development<br>○ Functional Pattern<br>○ WAT Scatterplot<br>○ Readbad Signatures | | |
| 646 | Data Preview (lots)<br>☐ check all<br>☐ uncheck all | | | Action |

| Fab 720 | Family 614 | Device 722 | Time Ranges 618 |
|---|---|---|---|
| ☐ check all | ☐ check all | ☐ check all | ⦿ yesterday ~619 |
| ☐ uncheck all | ☐ uncheck all | ☐ uncheck all | ○ last 7 days |
| ☐ A | ☐ 4V | ☐ 2VP100 | ○ last 30 days |
| ☐ A_EZP | ☐ 5V | ☐ 2VP2 | ○ last 90 days |
| ☐ AI | ☐ CR2 | ☒ 2VP20 ~724 | ○ last 180 days |
|  | ☐ QV2 | ☐ 2VP30 | ○ last 365 days |
|  | ☐ S2 | ☐ 2VP4 | ○ custom |
|  | ☐ S2E | ☐ 2VP40 | Start Date: |
|  | ☐ S3 | ☐ 2VP50 | 2005 08-22 |
|  | ☐ S3E | ☐ 2VP7 | End Date: |
|  | ☐ V1 | ☐ 2VP70 | 2005 08-24 |
|  | ☐ V1A | ☐ 2VPX20 |  |
|  | ☐ V2 | ☐ 2VPX70 |  |
|  | ☒ V2P ~624 |  |  |
|  | ☐ VA |  |  |
|  | ☐ VE |  |  |
|  | ☐ VEA |  |  |
|  | ☐ VEM |  |  |
|  | ☐ XLA |  |  |
|  | ☐ XPLA3 |  |  |
| (Narrowed) |  | (Narrowed) |  |

| X Axis 730 | Report 736 | Options 740 |
|---|---|---|
| ⦿ wafer | ○ Progressive Bin Dist. | ⦿ All Bins ~742 |
| ○ lot    738 | ⦿ Sort Bin Dist. | ○ Good Bins |
| ○ lot-device | ○ Sort Scatterplot | ○ Fail Bins |
| ○ week | ○ Sort Parametric | ○ Custom |
| ○ month | ○ DO/Wafer Volume |  |
| ○ quarter | ○ WAT | ⦿ Percent ~747 |
| ○ fab | ○ WAT Summary | ○ Count |
| ○ family | ○ WAT Violations | Overlay: |
| ○ device | ○ Wafer Maps | ☐ Engineering DD (all wafers) |
| ○ mask | ○ Shmoo | ☐ Ship DD (wafer w/DD < scrap limit) |
| ○ test program | Development | ☐ Best DD |
| Order by: | ○ Functional Pattern | ☐ Volume |
| ⦿ Date and Time | ○ WAT Scatterplot | ☐ Exclude Engineering Wafers |
| ○ Alpha-Numeric | ○ Readback Signatures | Parameter |

732 → (X Axis)
734 → (Order by)

| Date | Fab | Family | Device | Lot | Parameter | Violations | Limit |
|---|---|---|---|---|---|---|---|
| 2005-08-19 14:04:27 | A | V2P | 2VP50 | KY855 | ILJN+/PW | 3 | MCL_V2P |
| 2005-08-19 14:04:27 | A | V2P | 2VP50 | KY855 | IOFFN 10/.12 | 31 | MCL_V2P |
| 2005-08-19 14:04:27 | A | V2P | 2VP50 | KY855 | IOFFN 10/.12 LVT | 33 | MCL_V2P |
| 2005-08-19 14:04:27 | A | V2P | 2VP50 | KY855 | IOFFN 10/.24 IO | 7 | MCL_V2P |
| 2005-08-19 14:04:27 | A | V2P | 2VP50 | KY855 | IOFFP 10/.12 | 17 | MCL_V2P |
| 2005-08-19 14:04:27 | A | V2P | 2VP50 | KY855 | IOFFP 10/.12 | 1 | SPEC_V2P |
| 2005-08-19 13:49:40 | A | V2P | 2VP100 | KY858 | IDSN 10/.12 LVT | 1 | SPEC_V2P |
| 2005-08-19 13:49:40 | A | V2P | 2VP100 | KY858 | IIDSN 10/.12 LVT | 1 | MCL_V2P |
| 2005-08-19 13:49:40 | A | V2P | 2VP100 | KY858 | ILJN+/PW | 2 | MCL_V2P |

| Fab 920 | Family 924 | Device 926 | Time Ranges 928 |
|---|---|---|---|
| ☐ check all<br>☐ uncheck all<br>☑ A — 924<br>☐ B | ☐ check all<br>☐ uncheck all<br>☑ 4V<br>☐ QV2<br>☐ S2E<br>☐ S3<br>☐ S3E<br>☐ V2<br>☐ V2P<br>☐ VE<br>☐ VEA | ☐ check all<br>☐ uncheck all<br>☐ 4VFX100<br>☐ 4VFX12<br>☐ 4VFX20<br>☐ 4VFX60<br>☐ 4VLX100<br>☐ 4VLX160<br>☐ 4VLX200<br>☐ 4VLX25<br>☐ 4VLX60<br>☐ 4VSX25<br>☐ 4VSX35<br>☐ 4VSX55 | ○ yesterday<br>● last 7 days ~ 952<br>○ last 30 days<br>○ last 90 days<br>○ last 180 days<br>○ last 365 days<br>○ custom<br>Start Date:<br>[2005 08-16]<br>End Date:<br>[2005 08-24] |

| X Axis 930 | Report 932 | Options 934 | |
|---|---|---|---|
| ○ wafer<br>● lot<br>○ lot-device<br>○ week<br>○ month<br>○ quarter<br>○ fab<br>○ family<br>○ device<br>○ mask — 942<br>○ test program<br>Order by:<br>● Date and Time<br>○ Alpha-Numeric | ○ Progressive Bin Dist.<br>○ Sort Bin Dist.<br>○ Sort Scatterplot<br>○ Sort Parametric<br>○ DO/Wafer Volume<br>○ WAT<br>○ WAT Summary<br>○ WAT Violations<br>○ Wafer Maps<br>● Shmoo<br>Development:<br>○ Functional Pattern<br>○ WAT Scatterplot<br>○ Readback Signatures | Voltage:<br>[0.900->1.600(0.025) ▼] — 950<br>Frequency:<br>[50.00/20.00 ▼] — 952<br>○ Pattern Percentages<br>○ Pattern Min/Max<br>○ Die Min/Max — 954<br>● Die Level Results<br>☐ Report Failures Only | |

| Data Preview (wafers) | | | Action |
|---|---|---|---|
| ☐ check all<br>☐ uncheck all<br>☑ KW347<br>☐ KW623 | | | [DOWNLOAD CSV]<br>[VIEW SHMOO] |

921, 924, 950, 954, 936, 940

| Date | Device | Lot | Wafer | X | Y | Config. | Function | Vcc_start | Vcc_stop | Stop |
|---|---|---|---|---|---|---|---|---|---|---|
| 2005-08-15 11:14:06 | 4VLX100 | KW347 | 01 | 8 | 1 | 50.00 | 20.00 | 0.900 | 1.600 | 0.025 |
| 2005-08-15 11:14:06 | 4VLX100 | KW347 | 01 | 8 | 1 | 50.00 | 20.00 | 0.900 | 1.600 | 0.025 |
| 2005-08-15 11:14:06 | 4VLX100 | KW347 | 01 | 8 | 1 | 50.00 | 20.00 | 0.900 | 1.600 | 0.025 |
| 2005-08-15 11:14:06 | 4VLX100 | KW347 | 01 | 8 | 1 | 50.00 | 20.00 | 0.900 | 1.600 | 0.025 |
| 2005-08-15 11:14:06 | 4VLX100 | KW347 | 01 | 8 | 1 | 50.00 | 20.00 | 0.900 | 1.600 | 0.025 |

FIG. 14A

| FIG. 14A |
|---|
| FIG. 14B |

FIG. 14

| Pattern | brgle_config | 0.9V | 0.92by | 0.99V | 0.975V | 1V | 1.025V | 1.05V | 1. |
|---|---|---|---|---|---|---|---|---|---|
| Zerosrdbk_8bit_single_1_1vs | NC | = | = | = | = | = | = | = | = |
| Onesrdbk_8bit_1_1_nmx_sm8_sing | Null | = | = | = | = | = | = | = | = |
| chkr_clb_A_8bit_1_1_nmx_sm8_si | Null | = | = | = | = | = | = | = | = |
| chkr_clb_B_8bit_1_1_nmx_sm8_si | Null | = | = | = | = | = | = | = | = |
| chkrbramA_frc_8bit_1_1_nmx_sm8 | Null | = | = | = | = | = | = | = | = |

METHOD AND SYSTEM FOR COLLECTION, ANALYSIS, AND DISPLAY OF SEMICONDUCTOR MANUFACTURING INFORMATION

FIELD OF THE INVENTION

One or more aspects of the invention relate generally to collection, analysis, and display of semiconductor manufacturing information.

BACKGROUND OF THE INVENTION

The fabrication and packaging of integrated circuit devices (ICs) is a complicated process. An IC is created by fabricating hundreds or thousands of devices onto a silicon wafer. Each device (die) is then packaged and used as a component in a larger electronic system. In such a complicated manufacturing process thousands of data points are recorded at different stages of the process and it is critical that engineers can analyze and correlate this data.

The critical dimensions of the devices—for example thicknesses and lengths—are measured during the fabrication process and are commonly referred to as INLINE parameters. The electrical characteristics of the wafer are tested at WAT (Wafer Acceptance Test, otherwise known as "ETEST") using test structures in the die periphery. Finally, the functionality and performance of each die is tested at WAFER SORT. The purpose of INLINE and WAT is primarily data collection, however during WAFER SORT die are "binned" into categories which include many different pass and fail bins. The nature of the pass or failure characterizes the die and dictates which bin number is assigned. The testing of application specific integrated circuits (ASICs) is well established, however the testing of programmable logic devices (PLDs)—for example, field programmable gate arrays (FPGAs)—is a little more complex and involves additional testing since PLDs may be programmed with many different user designs. For instance, in SRAM-based FPGAs a readback test is done to verify the basic functionality of the configuration memory cells while additional patterns test if the device will work under thousands of different configurations. Die which fail either readback or one of the many functional patterns will be assigned a bin depending on which test it fails first ("stop-at-fail testing"). In addition to pass/fail data, WAFER SORT also includes performance testing where passing die are sorted into bins by device speed (performance). The bin number (good or bad) is logged to a data file with X and Y coordinates identifying the location of each die on the wafer. The wafer is then sawn and each die is packaged and tested once again at FINAL TEST to guaranteed specification limits. IINLINE, WAT and WAFER SORT data is collected at ambient temperature while FINAL TEST is conducted at elevated temperatures. During all of these steps, data is logged and collected for analysis. Note that the description of these tests is not intended to be comprehensive, but gives some indication of the tests performed and data collected during the IC manufacturing process.

In order to improve the manufacturing process of ICs in general, such as reducing defects, the manufacturing data is collected and analyzed. Conventional commercial tools such as the dataPOWER™ product from PDF Solutions, Inc (see http://dp.pdf.com/site/products/dpc_core.html) or the dataConductorEP product from Syntricity, Inc. of San Diego, Calif. (see http://www.syntricity.com/Products/o_datace-.htm) takes data from throughout the manufacturing process (from fabrication to final test), aligns, organizes and stores the data in a database, and displays the data in order to allow users to analyze yield and production issues quickly.

While the above conventional commercial tools are useful, many are typically for ASICs, client-server based with a platform dependent fab client, or limited to data from one manufacturer. Thus there is a need for an improved software tool that automatically collects and integrates data from multiple IC manufacturers and allows real-time access to reports and charts generated from the data.

SUMMARY OF THE INVENTION

One or more aspects of the invention generally relate to collection, integration, analysis, and display of information from multiple semi-conductor manufacturers. An exemplary embodiment includes a method for processing semi-conductor manufacturing data. The method includes: capturing files from a plurality of manufacturing data sites having semi-conductor manufacturing data; converting the files into a standard format for storage in a database; building a query from a client device using a plurality of sets of selections, wherein when a first selection is made by the client device in a first set of the sets of selections, a second set of the sets of selections is dynamically changed to only display a displayed set of selections on the client device limited to selections associated with the first selection; and generating a report for the client device based on the built query and the converted files stored in the database.

Another embodiment of the invention includes a server system for receiving and processing manufacturing data from a plurality of semi-conductor manufacturers. The server system includes: a file capture module for receiving the manufacturing data from the plurality of semi-conductor manufacturers; a format conversion module coupled to the file capture module, where the format conversion module converts the manufacturing data to a standard database format for storage in a database; a query builder module coupled to a client web browser for interactively changing contents of the client web browser depending upon a plurality of client selections on the client web browser, where the query builder module is configured to build a final query based on the plurality of client selections; and a report generation module coupled to the database and the query builder module, where the report generation module generates a report based on the final query.

Embodiments of the present invention will be more full understood in view of the following description and drawings.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

FIG. 5A is an example of prior art data storage in the database of unit level data;

FIG. 5B shows the storage of the data of FIG. 5A, in a more efficient arrangement of an embodiment of the present invention;

FIG. 5C is a block diagram depicting an exemplary embodiment a data structure that may be used to store data in the database of FIG. 2;

FIG. 8 is a part of the GUI of an embodiment of the present invention;

FIG. 9 is a new view of part of the GUI generated after the user has made a fab selection;

FIG. 12 is a part of a table that may be generated by the report generation module, when the download CSV button of FIG. 10 A/B is chosen;

FIG. 13 is another GUI view of another embodiment of the present invention;

FIGS. 14A and B are an example of a Shmoo table; and

DETAILED DESCRIPTION OF THE DRAWINGS

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items; however, in alternative embodiments the items may be different.

Figure 1:
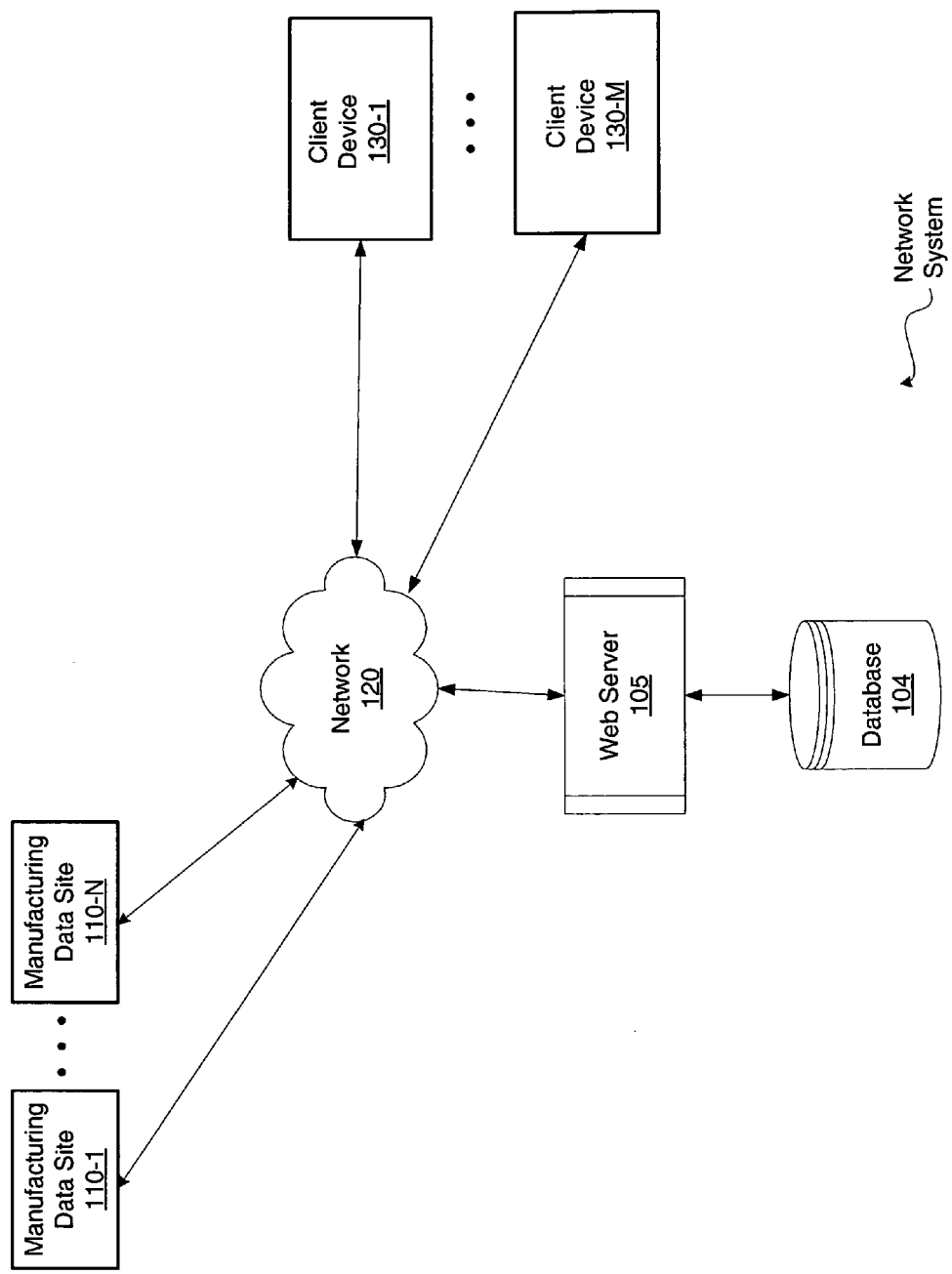
FIG. 1 is a simplified network diagram depicting an exemplary embodiment of a network system.

FIG. 1 is a simplified network diagram depicting an exemplary embodiment of a network system 100. Notably, network system 100 is described in terms of data collection for manufacturing of ICs. Data associated with IC manufacturing is well known and is thus provided by way of example and not by way of limitation, as other types of data from multiple locations may be collected and processed in accordance with the following description.

One or more manufacturing data sites 110-1 through 110-N (collectively referred to as 110 for convenience), for N a positive integer greater than one, are coupled to network 120. The manufacturing data sites may include ftp sites of one or more manufacturers. Network 120 is used to transfer semiconductor manufacturing data files from the manufacturing data sites 110-1 through 110-N to web server system 105, where web server 105 is coupled to database 104. Network 120 is also coupled to client devices 130-1 through 130-M (collectively 130), for M a positive integer greater than one. There are many possible configurations for network 120, such as a wide area network ("WAN"), a local area network ("LAN"), or any combination of one or more WANs or LANs. Furthermore, network 120 may include use of the Internet or other public network.

One embodiment of the present invention illustrates in FIG. 1 a web server having a database which collects IC, such as PLD, manufacturing information from multiple manufacturers and then distributes processed manufacturing information to multiple client devices via a network such as the internet. The multiple manufacturers, in one example, could be separate PLD manufacturing facilities located in different countries. The Web server 105 collects and integrates the PLD manufacturing information from multiple manufacturing data sites 110 into one database. Each client device which may be a personal computer having a display, either co-located with the web server 105 or located remotely, interacts with web server in order to request and receive various types of textual and graphical reports and alerts. The textual and graphical reports and alerts are used to improve the PLD manufacturing process.

Figure 2:
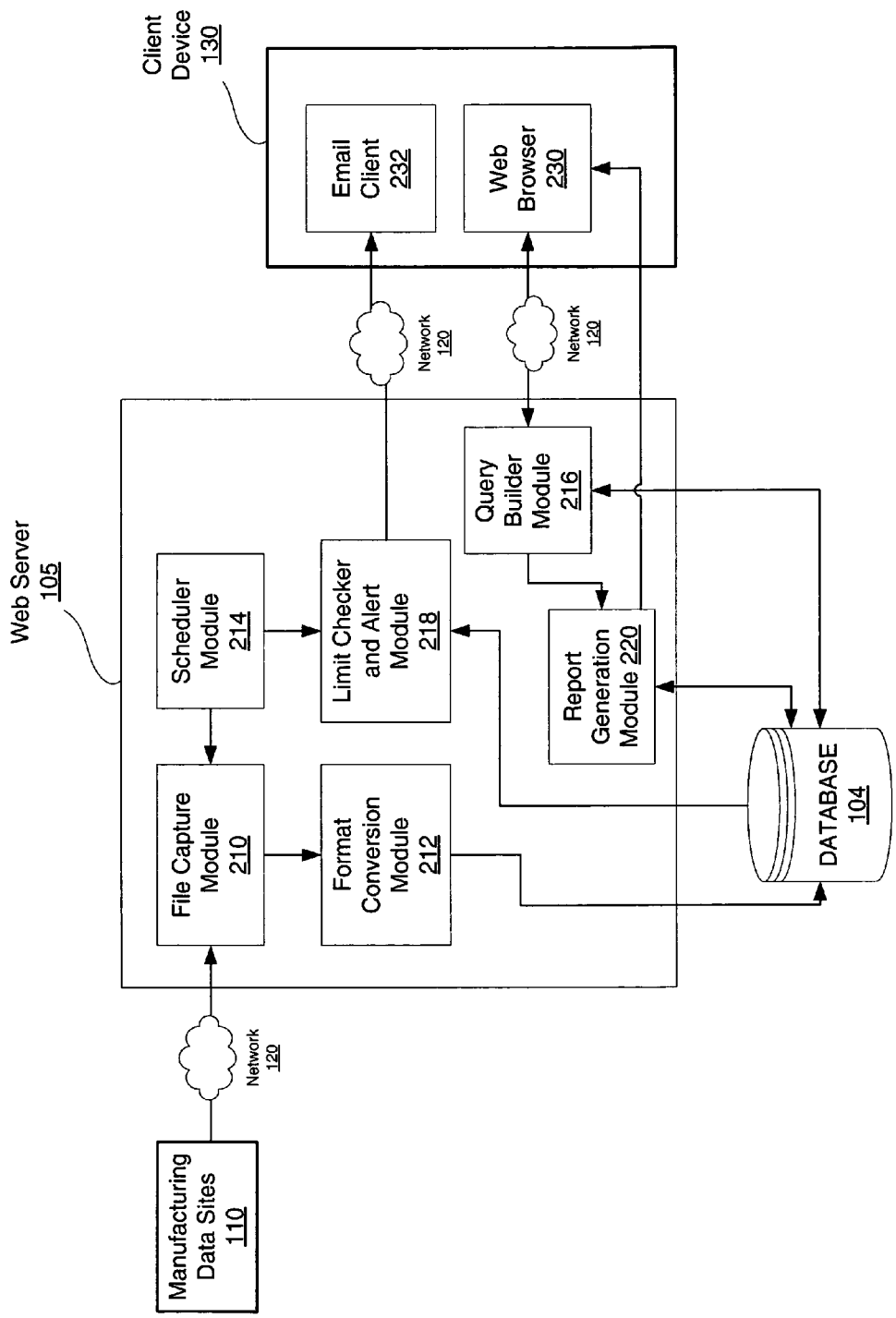
FIG. 2 shows some of the software modules associated with the simplified network of FIG. 1 of an embodiment of the present invention.

FIG. 2 shows some of the software modules associated with the simplified network of FIG. 1 of an embodiment of the present invention. Web Server system 105 includes file capture module 210 coupled to format conversion module 212, scheduler module 214 coupled to the file capture module 210 and limit checker and alert module 218, and query builder module 216 coupled to report generator module 220. Web server system 105 is connected to database 104 and one or more client devices 130, where each client device includes an email client 232 and a web browser 230. The database 104 may include database software such as an Oracle database from Oracle Corporation or SQL server from Microsoft Corporation.

Manufacturing data files from the plurality of manufacturing data sites 110 are provided to file capture module 210. The manufacturing information may be pulled from the manufacturing data sites 110 ftp servers at times determined by scheduler module 214. As the data comes from different manufacturers there will be several different data formats received by the file capture module 210. These various data formats are converted into a standard database format by the format conversion module 212 for storage in database 104. The manufacturing data from database 104 is statistically analyzed by limit checker and alert module 218 at times determined by scheduler module 214. If the data exceeds predetermined statistical limits, then an alert is sent via email to the email client 232 on client device 130. In another embodiment a user may define limits, which are then used by the limit checker 218 when analyzing the manufacturing data from database 104.

The consolidated manufacturing data in database 104 from the multiple manufacturing data sites 110, may be accessed by one or more client devices via a web browser 230 having a graphical user interface (GUI), see for example FIGS. 6 to 10). The query builder module 216 consists of a series of push and pulls from the client web browser 230 in order to dynamically build up a final query to be sent to the report generation module 220. The client device 130 pushes a criteria or selection and the query builder module 216 generates a new display view for the GUI with that criterion taken into consideration. Then the client device pulls and displays that new display view (see for example FIGS. 8-10). There can be many iterations before the final query is ready to be executed. When the user is satisfied, he is able to execute the "action" button of the GUI (see for example, the action field 770 with first action button, download CSV 772 and second action button, interactive stacked bar chart 774, in FIG. 10 A/B). Then the report generation module 220 starts and generates the report using the final query and manufacturing data from the database 104. A static or interactive graph or a CSV (comma delimited) file in the form of a table is then sent from the report generation module 220 to the GUI on web browser 230.

Figure 3A:
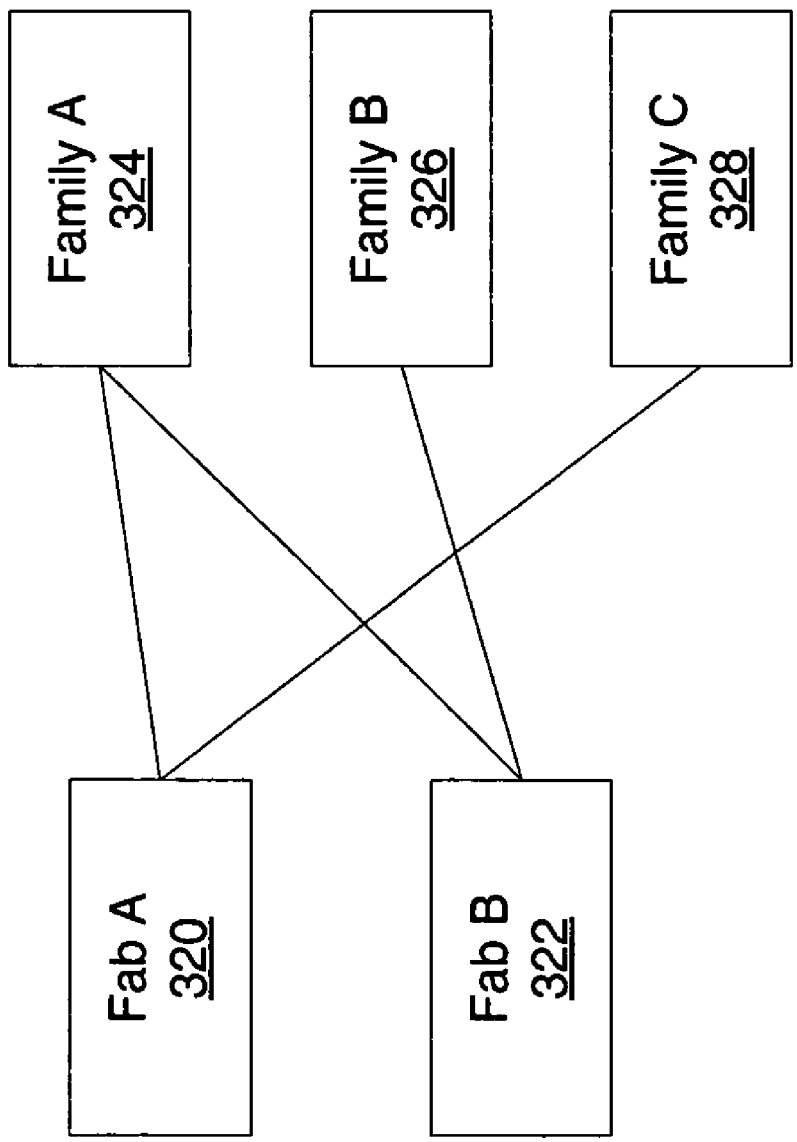
FIG. 3A shows the inter-relationship between two fabs and three families.
Figure 3B:
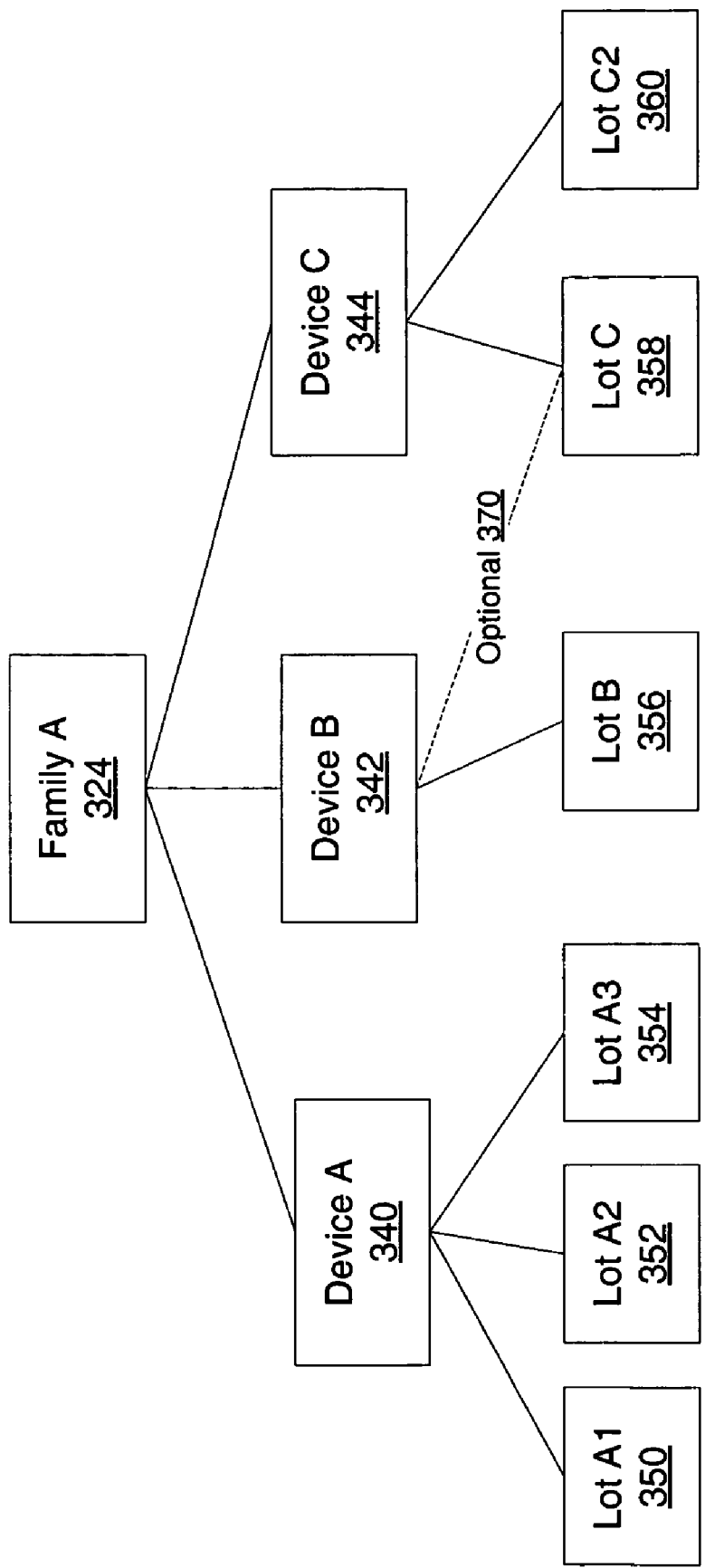
FIG. 3B shows a hierarchical family tree for family of FIG. 3A.

FIGS. 3A and 3B show the relationship between fabrication facilities (fabs), families of semiconductor devices, particular devices, and lots. A particular fab can manufacture many families. For example, Fab A manufactures Xilinx's Virtex-4 (V4) and Spartan-3 (S3) FPGAs. A particular family can be manufactured in multiple fabs. For example, Spartan 3 in manufactured in both fabs A and 8D. A family is a collection of devices. For example, the Xilinx Virtex-4 FPGA can include devices 4VLX25, 4VLX100, 4VFX100, and so forth. A lot typically belongs to only one device. A lot has a plurality of wafers, for illustration, a lot has 25 wafers. A wafer has a plurality of dies, where the good dies are packaged.

FIG. 3A shows the inter-relationship between two fabs, 320 and 322, and three families, 324, 326, and 328. Fab 320 is connected to families 324 and 328, and Fab 322 is connected to families 324 and 326, hence illustrating that a fab can manufacture two families. Family 324 can be manufactured by both fabs 320 and 322.

FIG. 3B shows a hierarchical family tree for family 324 of FIG. 3A. Family 324 has children devices 340, 342, and 344. Device 340 has three children lots 350, 352 and 354. Device 342 has one child lot 356. Device 344 has two children lots 358 and 360. In an alternative embodiment the relationship between family-device-lot need not be hierarchical but more like a graph. For example, in addition to the link between lot 358 and device 344, link 370 may exist between lot 358 and device 342. If a lot 358 has, for example, 25 wafers, this means that some of the wafers belong to device 342 and some to device 344.

FIGS. 3A and 3B disclose in one embodiment how the query builder module 216 can dynamically build up the user's query for a particular report. As an illustration, let the set of fab selections include the fab selections 320 and 322, the set of family selections include the family selections 324, 326, 328, the set of device selections for family 324 be 340, 342, and 344, and the set of lot selections be 350, 352, 354, 356, 358, and 360. When, for example, the user selects from the fab set of selections, fab 320 and this is sent to query builder module 216, then the query builder module 216 tells the GUI only to display families 324 and 328, as family 326 is only made at fab 322. This limiting of the families that the user can select, after the fab is selected can significantly reduce user error.

Other examples include the user first selecting family 326 and the query builder module 216 instructing the web browser 230 to display only the fab 322 selection. When the user first selects Fab 320 and next family 324 from the reduced set of family selections having only family A 324 and family C 328, then the user is shown the set of device selections as shown in FIG. 3B. If the user then chooses device A 340, this choice is sent to the query builder module 216, which in turn tells the GUI to display only lots 350, 352, and 354. In yet another example, in FIG. 3B, when the user selects the lot C2 360 selection from the set of lot selections 350-360, device C 344 of the device set, family A 325 of the family set, and both fabs 320 and 322 are displayed. Therefore, in one embodiment, the user can make one or more selections in one or more of the fab set of fab choices, family set of family choices, device set of device choices, or lot set of lot choices, and the other sets are dynamically filtered accordingly by the query builder module 216.

Thus FIG. 3A shows the fabrication set, e.g., fabs A and B, and the family set, families A, B, and C, have a many-to-many relationship. And FIG. 3B shows that a family of the family set, e.g. family A, and a corresponding device set, e.g., devices A, B, and C, form a parent child relationship, respectively and a device, e.g., A, of the device set and corresponding lot set, e.g., lots A1, A2, and A3, form another parent child relationship, respectively.

Figure 4:
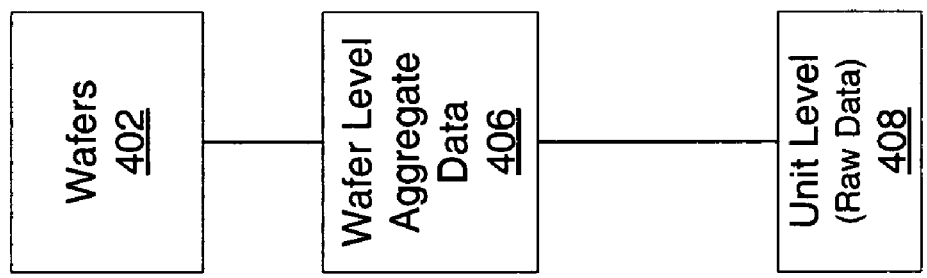
FIG. 4 shows the hierarchical arrangement of wafer data stored in a database.

FIG. 4 shows the hierarchical arrangement of wafer data stored in database 104. The wafer data 402 includes a wafer identifier (WID); the wafer level aggregate data 406 includes WID, statistical values such as mean and median; and the unit level data 408 includes WID, die number, and parameter data, such as speed, and threshold voltage data.

FIG. 5A is an example of prior art data storage in the database 104 of unit level data 408. Each row 420-426 has wafer ID 410, die number 412, a parameter 414, and a parameter data value 416. For more efficient storage and faster retrieval, FIG. 5B shows the storage of the data of FIG. 5A, in a more efficient arrangement of an embodiment of the present invention. Row 430 has the wafer ID 410 and parameter 414 which is the same as FIG. 5A, namely Wafer ID 1 and parameter A. The data set 428 of row 430 includes a (die number 412, data 416) pair. For example, die number 1 with data 4.1 of row 420 becomes (1, 4.1) of data set 428 and die number 2 with data 3.2 of row 420 becomes (2, 3.2) of data set 428.

FIG. 5C is a block diagram depicting an exemplary embodiment a data structure 440 that may be used to store data in database 104 of FIG. 2. Each row of data structure 440 includes a wafer identifier, a parameter, and data associated with the parameter for that wafer. For example, wafer identifiers 441-1 through 441-M, for M a positive integer, are respectively associated with parameters 442-1 through 442-M. Parameter data sets 443-1 through 443-M are respectively associated with parameters 442-1 through 442-M for each wafer identifier 441-1 through 441-M. Data sets 443-1 through 443-M may include an X value and a Y value. The X value and the Y value indicate a die of a wafer. Thus, by associating X and Y wafer coordinates to one or more parameter values for a wafer, each die data point for a parameter for an identified wafer may be grouped into a single row. There are many known parameters that may be used in testing a wafer or a die from a wafer, including temperature, voltage, amperage, resistance, speed, and frequency, among other known parameters. The X and Y values, for example, for data set 443-1 are for each die of a wafer associated with wafer identifier 441-1. Thus, each data point for each die of a wafer for a parameter 442 may be in a single row. This facilitates data retrieval and processing for parameterized charting of data.

Figure 6:
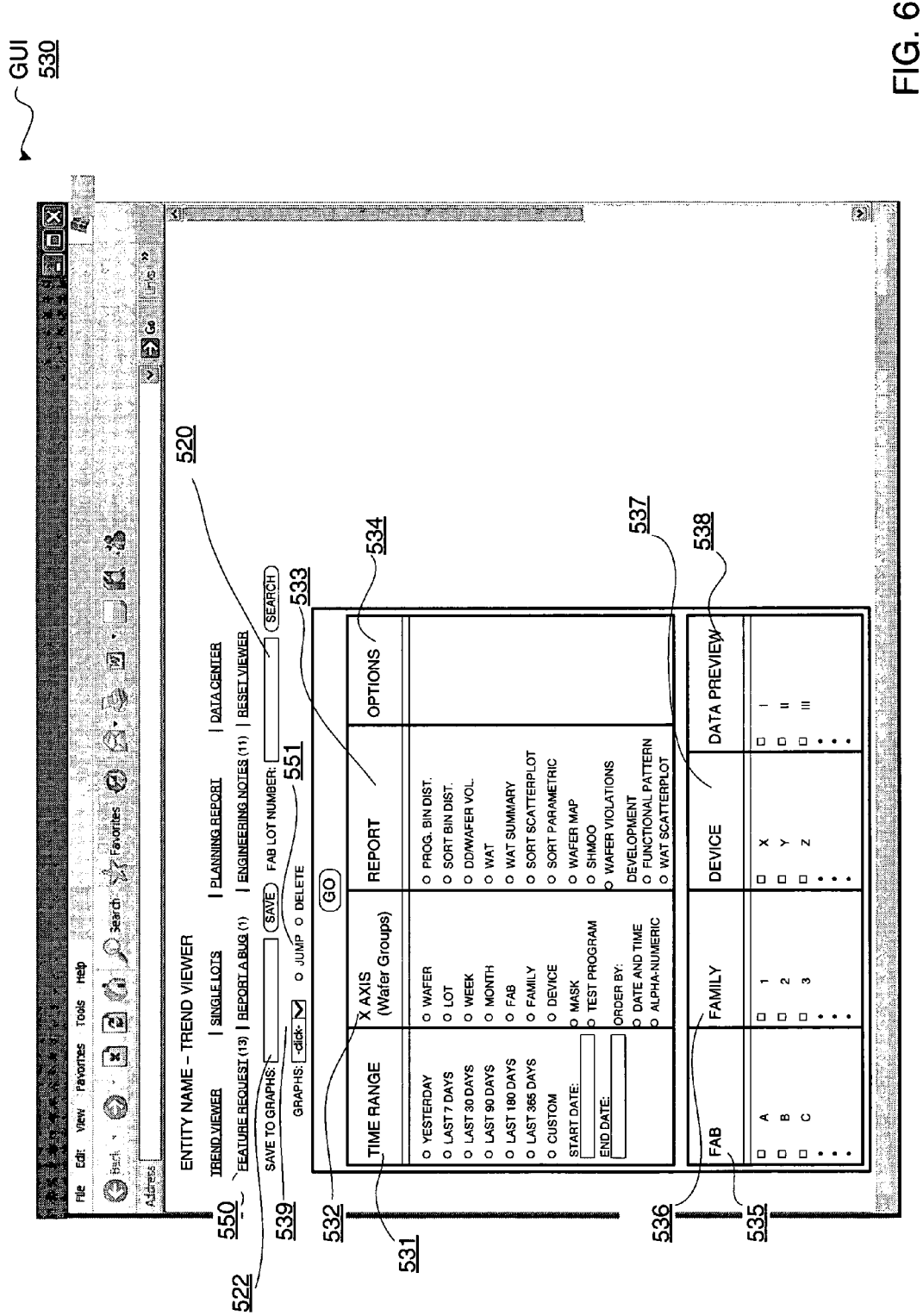
FIG. 6 is a screen view depicting an exemplary embodiment of a GUI.

FIG. 6 is a screen view depicting an exemplary embodiment of a GUI 530. GUI 530 is shown as part of a screen display window for a web browser, which may be displayed on a display device. Notably, GUI 530 is for a trend viewer to view trends of a fab. Other types of viewing may be for single lots, planning reports, or a general data center. The save to graphs field 522 allows the current user selections to be saved. Thus a user can save all the selections producing a report, i.e., the final query constructed by the query builder module 216.

A graph pull-down menu 539 may be used along with selecting jump 551 to access a previously used graph format. Otherwise, fields for generating a graph may be selected. One of such fields may be a time range field 531. Time range field 531 may be configured using a start date and an end date. Alternatively, fixed, pre-defined values may be used, such as "yesterday," "last 7 days," "last 30 days," "last 90 days," "last 180 days," or "last 365 days." Time range field 531 provides a time range for which the data shall be retrieved. X axis field 532 is to select a wafer group which is displayed in the data preview 538 and is used as the X axis if a chart is generated. Examples of wafer groups include wafer (wafers), lot (list of lots and wafers by lot), lot-device (wafers by lot-device), week (wafers in a week), month (wafers in a month), fab (wafers by fab), product family (wafers by family), device (wafers by device), mask (wafers by mask), and test program (wafers by test program). Mask is to indicate a device mask set used for fabrication, and test program is to indicate a test program revision used to generate the data. X axis data may be ordered by date and time or alpha-numerically. Report field 533 may be used to select a pre-defined type of report. Examples of types of reports listed include a progressive bin distribution, a sort by bin distribution, a defect density by wafer volume, a WAT, a WAT summary, a WAT violations, a sort scatter plot, a sort by parameter, schmoo plots, or wafer maps. Other reports include a functional pattern and a WAT scatter plot. Additionally, there may be an options field 534 to report specific options relevant to each of the different reports. In an alternative embodiment table 1 below lists report choices for report field 533:

TABLE 1

| | |
|---|---|
| Progressive Bin Distribution: | Bin failure percentages reflecting the order the bins are tested |
| Sort Bin Distribution: | Bin failure counts/percentages, percentages calculated against total die tested. |
| Sort Scatterplot: | allows graphing of one sort parameter against another. |
| DD/Wafer Volume: | DD aggregated up to what's selected on the X and total number of wafers aggregated into that "X" selection. DD is defect density, a way to represent yield on a device-independent basis. |
| WAT (Etest Data) Allows individual Etest parameters to be analyzed. | |
| WAT Summary: | Allows the user to work with groups of Etest parameters. |
| WAT Violations: | User can analyze Etest data that caused the alert controlling to issue violation emails. |
| Shmoo & Readback signatures: | Two types of diagnostic reports. |
| Functional Pattern: | Provides more in-depth information as to why particular bins (functional) fail. |
| WAT Scatterplot: | Allows one etest parameter to be plotted against another. |
| Wafer Maps: | A spatial representation what bin each die on the wafer falls into |
| Inline: | User can analyze Inline data (Data generated during wafer manufacturing) |
| Inline Violations: | Same as WAT violations but for Inline |
| Wafer Sort Violations: | Same as above but Wafer Sort Single lot screen shot |

A fab field 535 (i.e., a set of fab selections) may be used to select a fab for which associated data is to be retrieved from database 104 of FIG. 1. Family field 536 (i.e., a set of family selections) may be used to specify a family of the devices associated with the fab selected in field 535. In other words, fields 535 and 536 are inter-related; a fab selection in field 535 will identify which family or families of devices produced from such fab are available for data retrieval as associated with field 536. Also as seen by FIG. 3A, a family selection in family field 536 may narrow down the choices in the fab field 535.

Furthermore, device field 537 (i.e., a set of device selections) may be used to select a device or devices within a family or families selected responsive to family field 536. Thus, family field 536 and device field 537 are hierarchical, meaning that a selection of a family or families in family field 536 will generate options of selectable devices within those families for device field 537. The selections appearing under data preview field 538 are determined from the selection in the X axis field 532. For example, a listing of lots that may be selected where a lot is selected for X axis field 532 is an example of the data options that might appear for preview. Selecting a lot produces data associated with wafers in the lot.

Figure 7:
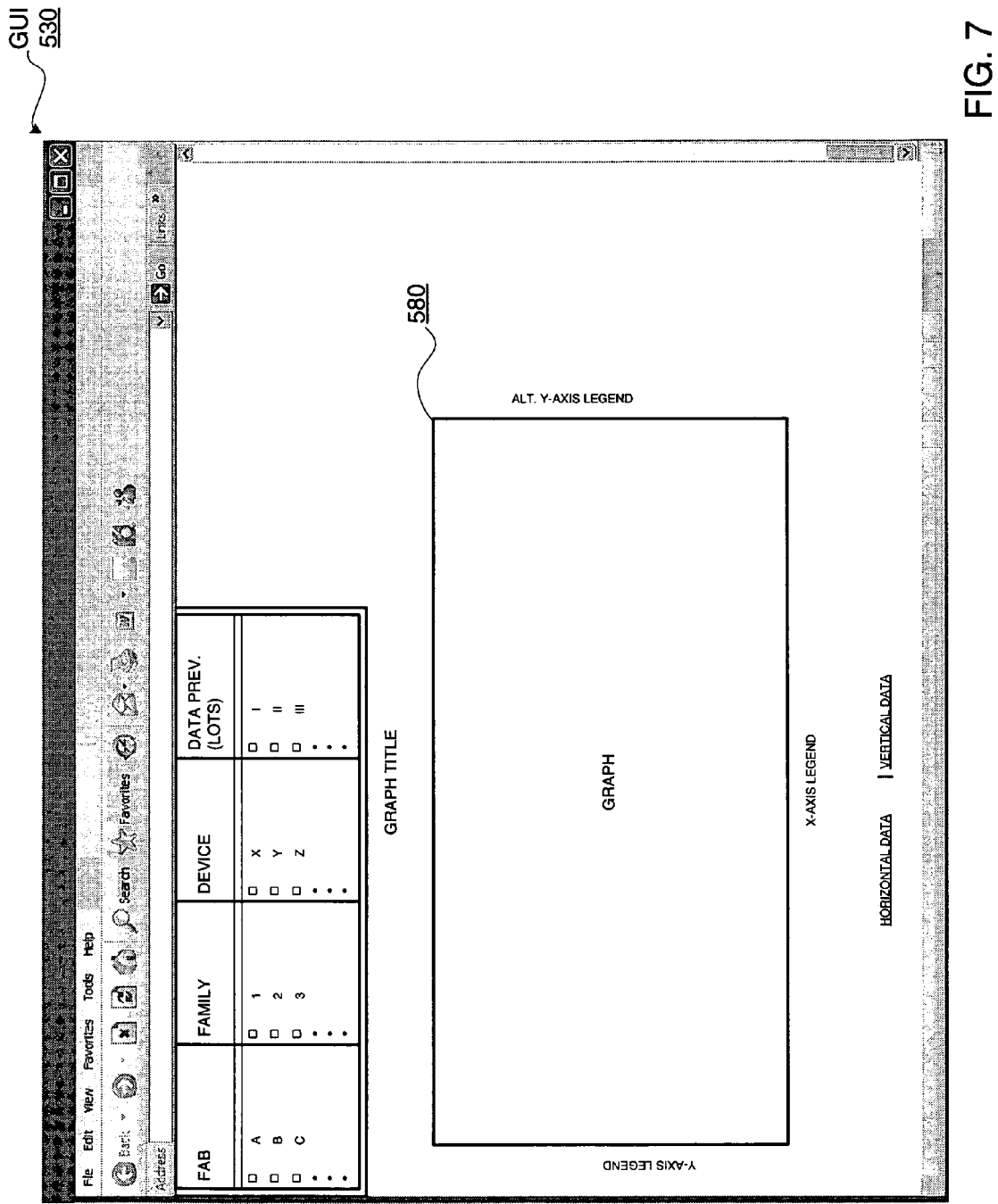
FIG. 7 is a screen view depicting an exemplary embodiment of GUI having a graph linked to the fields used to select data for retrieval.

After fields have been selected in GUI 530, data associated with such fields may be retrieved and charted as previously described. A chart may be generated in association with such data. FIG. 7 is a screen view depicting an exemplary embodiment of GUI 530 having a graph 580 linked to the fields used to select data for retrieval. Furthermore, one or more links to horizontal and vertical data for graph 580 may be provided to view data associated with the generation of such graph.

FIG. 8 is a part 610 of the GUI 530 of an embodiment of the present invention. Part 610 includes a fab lot number field 620 in which a lot number can be entered and searched, a fab field 612 having a set of fab selections, e.g., B 622, a family field 614 having a set of family selections, e.g., V2P 624 and 4V 626, a device field 616 having a set of device selections, e.g., 4VLX25 628 and V2P20 724, and a time range field 618, which gives the time range of manufacturing data previously collected to be used in producing the reports by the report generation module 220 of FIG. 2. In this case the time chosen is yesterday 619.

FIG. 9 is a new view 710 of part of the GUI generated after the user has made a fab selection of B 622. As shown the choices in the family set 714 and the choices in the device set 716 have been narrowed from family set 614 and device set 616 in FIG. 8, respectively. Also, shown in FIG. 9 is the selection of lot 650 in X Axis field 640, which gives all lots from B fab 622 as of yesterday 619, where the lots are shown in data preview 646. The historical time range 618 (e.g., yesterday 619) is overridden, if for example, only wafers in a partial lot may be included, when a lot choice is made in the X Axis (e.g., lot 650 and lot-device 651). The time range is extended to include the test collection dates of the wafers in the whole lot. For example, in FIG. 13 if lot 950 in X Axis 930, lot KW347 954, and last 7 days 952 in time range 928 were selected, then test data for all wafers in lot KW347 would be shown, even if wafers in lot KW347 had their test collection date before the last 7 days. In another embodiment, in FIG. 9, when the week 652, month 654, or quarter 656 selection in the X Axis field 640 is chosen, the time range field 618 is overridden.

Thus FIG. 9 shows a plurality of sets of selections, where when a first selection is made by the client device in a first set of the sets of selections, a second set of the sets of selections has a displayed set of selections on the client device limited to selections associated with the first selection. The plurality of sets of selections comprise: a fabrication set 612, a family set 714, a device set 716, and a lot set (Data Preview (lots) 646 or fab lot number 620). The plurality of sets of selections further includes a time range set 618, and a wafer group set 640. When a lot selection (not shown) is made from a lot set 646 and a time selection, e.g., 620, is made from time range set 618, the time selection, e.g., 620, is overridden when a wafer in the lot selection has data collected outside of the time selection. In addition, generating a report for the client device is further based upon a report selection in the report selection set 642 by the client device.

Figure 10B:
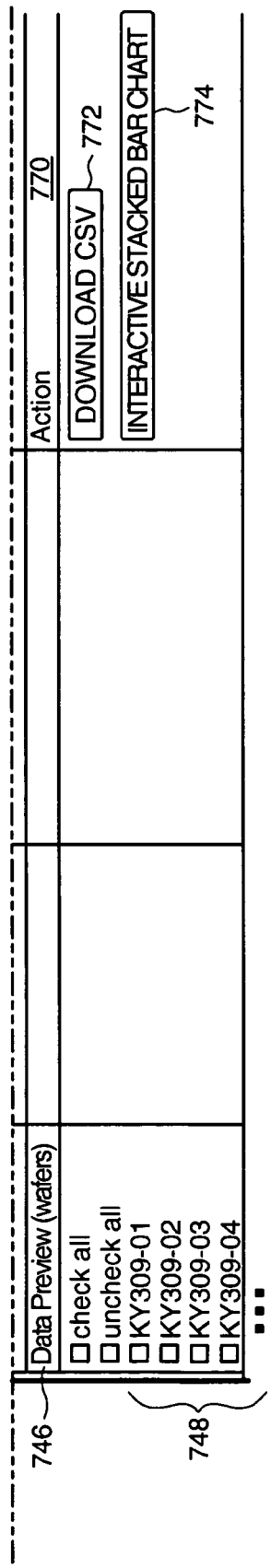
FIGS. 10A and B are another new view of part of the GUI generated after the user has made a family selection.
Figure 10:
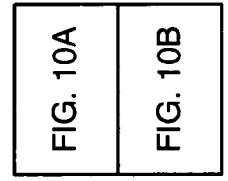

FIG. 10 A/B is another new view of part of the GUI generated after the user has made a family selection of V2P 624. As shown the choices in the fab set 720 and the choices in the device set 722 have been narrowed from fab set 612 and device set 616 in FIG. 8, respectively. Also, shown in FIG. 10 A/B is the selection of device 2VP20 724. In this example the family selection of V2P 624 was done first and then the selection of device 2VP20 724, hence in this embodiment the family field was not narrowed after the selection of device 2VP20 724. In the X-Axis field wafer 732 is selected, which means all wafers in the time range 619 (yesterday) ordered by date time 734 are shown in data preview 646 by lot-wafer number (for example, KY309-01, is lot KY309, wafer number 1 of 25). The report 736 to be generated is a sort bin distribution 738. The options field 740 has selections all bins 742 and percent 747. The chart generated by the report generation module 220 and shown on the Web Browser 230 (FIG. 2) when the action 770 button of interactive stacked bar chart 774 is selected, in general, has a shape like the chart shown in FIG. 11.

Figure 11:
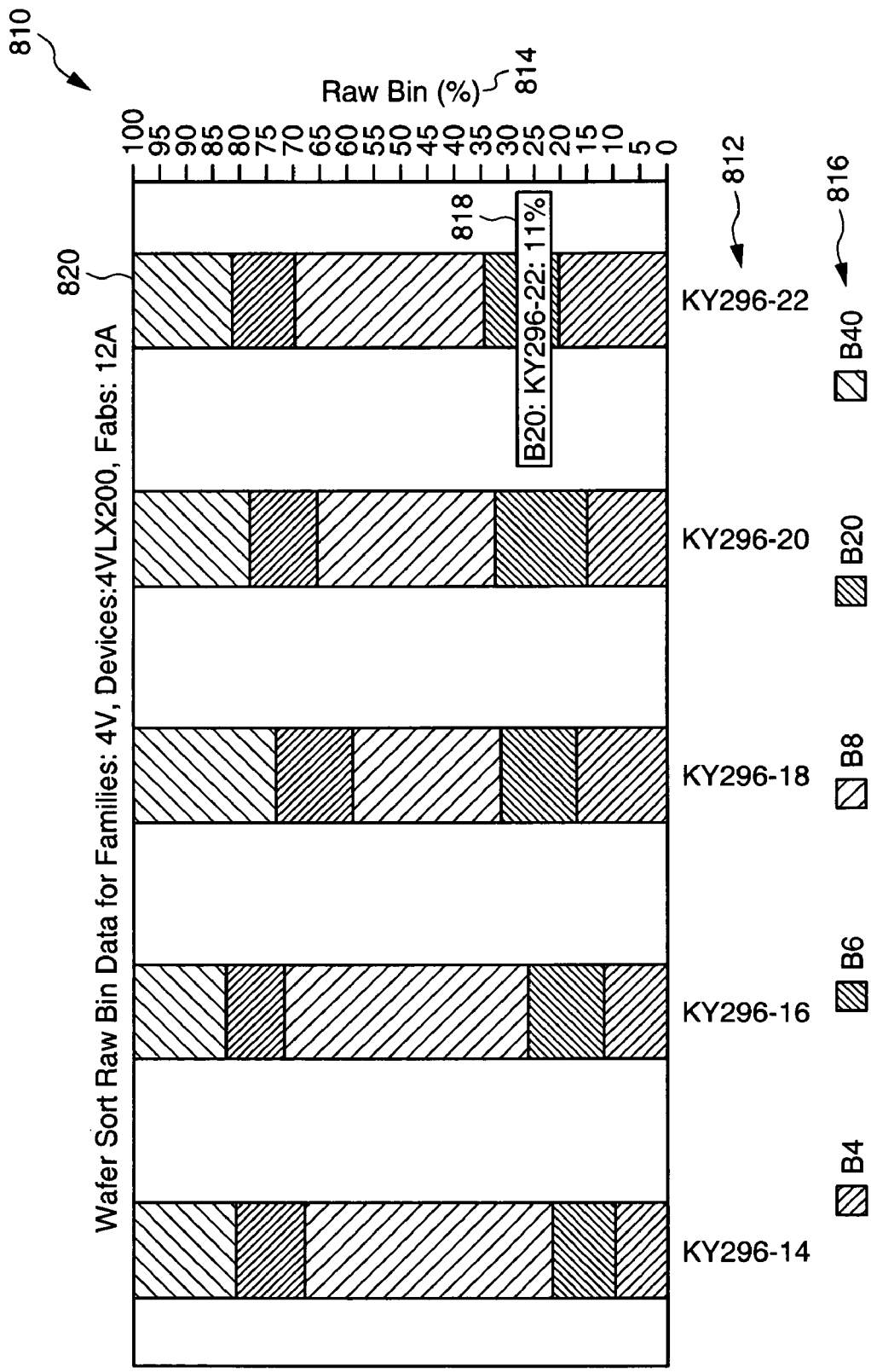
FIG. 11 is a very simplified bar chart showing the percentage of dies in each bin per a wafer in a lot.

FIG. 11 is a very simplified bar chart 810 showing the percentage 814 of dies in each bin per a wafer in lot KY296. Chart 180 has an x-axis 812 with the lot-wafer number. For this simplified example there are five bins 816: B4, B6, B8, B20, B40. The dies in a wafer are sorted into bins based on some requirements criteria. Thus bar 820 has various percentages of die in each of the five bins. When the mouse is located over one of portions of bar 820, for example, a window appears which shows the bin number, the lot-wafer number, and die percentage, e.g. B20: KY296-22: 11%.

FIG. 12 is a part 910 of the table that may be generated by the report generation module 220, when the download CSV button 772 of FIG. 10 A/B is chosen. Two rows 912 and 914 of table 910 show date/time, fab A, family V2P, device 2VP50, lot KY855, two different parameters, number of violations and limits. For example in row 912 the parameter is ILJN+/PW (a first hyperlink to a parameter document), the number of violations=3, and the specification limit is given in MCL_V2P (a second hyperlink to a limit document). In row 914 the parameter is IOFFP 10/0.12 (a third hyperlink to a parameter document), the number of violations=1, and the specification limit is given in SPEC_V2P (a fourth hyperlink to a limit document).

FIG. 13 is another GUI view 917 of another embodiment of the present invention. In the fab set 920, fab A 921 is selected. In the family set 924, 4V 924 is selected. The X Axis 930 has lot 950 and order by date and time 954 selected. The lot KW347 940 is selected. The report 932 generated is a Shmoo 942 report and this causes in the options field 934 to be displayed: a voltage range pull down 950 and a frequency range pull-down 952. An example of a Shmoo table generated is shown in FIG. 14 A/B.

Figure 15:
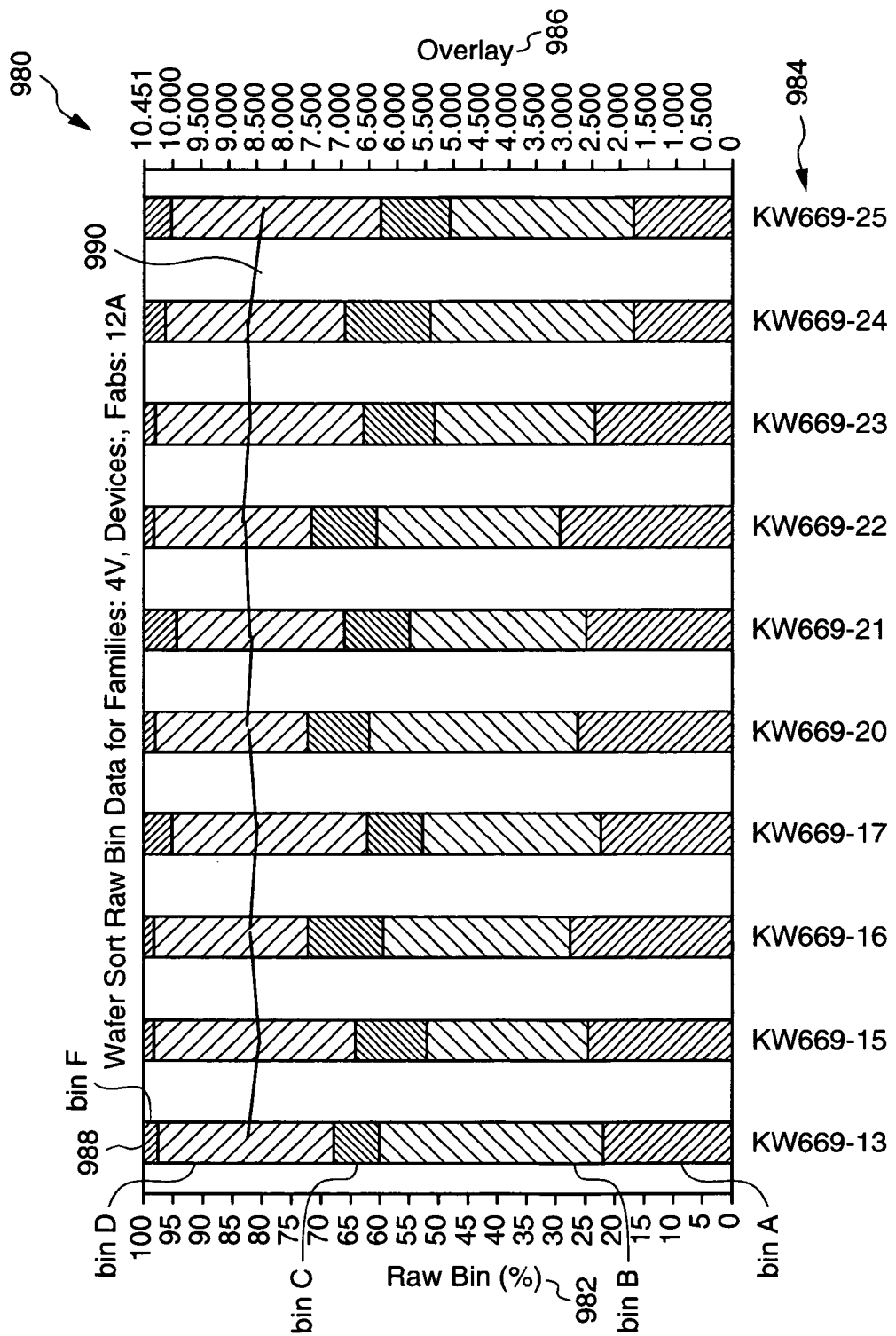
FIG. 15 is a simplified bar chart showing simplified wafer sort raw bin data with an overlay graph.

In one embodiment of the present invention a graphical report can be generated by the report generation module 220, which overlays graphically the graphical limits of the limit checker and alert module (FIG. 2). FIG. 15 is a simplified bar chart showing simplified wafer sort raw bin data with an overlay graph 990. Bar chart 980 has x-axis with the discrete lot (e.g., KW699)—wafer number (e.g., 13, 15, . . . ). The y-axis 982 has the percentage of dies in each bin (bins A-F) per wafer. An overlay scale 986 is on the right and an overlay line graph 990 connects the limit value for each wafer (13-25).

In one embodiment a Web server includes a computer program, stored in a computer readable medium, comprising: code for capturing files from a plurality of manufacturers having PLD manufacturing data; code for converting the files into a standard format for storage in a database; code for building a query from a client web browser using a plurality of sets of selections, wherein when a first selection is made by the client device in a first set of the sets of selections, a second set of the sets of selections has a displayed set of selections on the web browser limited to selections associated with the first selection; and code for generating a report for the client web browser based on the built query and the converted files stored in the database. The computer program may further comprise: code for checking limits of the PLD manufacturing data by accessing the database; code for comparing the PLD manufacturing data stored in the database with either predetermined statistical limits or user defined limits or a combination thereof; and code for alerting the client device, when any stored PLD manufacturing data exceeds the limits during the comparing.

The embodiment may further include a client device including code, stored in a computer readable medium, for forming a graphical user interface (GUI) on the client's web browser, the GUI comprising the first set and the second set; and code for receiving an email alert, when any stored PLD manufacturing data exceeds the limits during the comparing on the Web server.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners.

What is claimed is:

1. A method for processing semi-conductor manufacturing data comprising:
   capturing files from a plurality of manufacturing data sites having semi-conductor manufacturing data;
   the semi-conductor manufacturing data including test data;
   the test data indicating electrical characteristics;
   converting the files into a standard format for storage in a database;
   building a query from a client device using a plurality of sets of selections, wherein when a first selection is made by the client device in a first set of the sets of selections, a second set of the sets of selections is dynamically changed to only display a displayed set of selections on the client device limited to selections associated with the first selection;
   checking limits of the test data of the semi-conductor manufacturing data by accessing the database and comparing the test data of the semi-conductor manufacturing data stored in the database with limits therefor;
   a portion of the limits being user defined limits including a parameter limit associated with the electrical characteristics, the parameter limit being for threshold voltage;
   alerting the client device, when any stored semi-conductor manufacturing data exceeds one or more limit of the portion of the limits; and
   generating a report for the client device based on the built query and the converted files stored in the database.

2. The method of claim 1 wherein the capturing the files, converting the files, building the query and generating the report are performed on a Web server and the client device comprises a web browser for displaying the displayed set of selections.

3. The method of claim 1 wherein the altering includes sending an email to an email client on the client device.

4. The method of claim 1 wherein the checking limits and alerting the client device are performed on the Web server and the client device comprises a web browser for displaying the displayed set of selections.

5. The method of claim 1 further comprising:
scheduling when capturing files and checking limits occurs based on a predefined criteria.

6. The method of claim 1 wherein the plurality of sets of selections comprises: a fabrication set, a family set, a device set, and a lot set.

7. The method of claim 6 wherein the plurality of sets of selections further comprises: a time range set, and a wafer group set.

8. The method of claim 6 wherein when a lot selection is made from a lot set and a time selection is made from time range set, the time selection is overridden when a wafer in the lot selection has data collected outside of the time selection.

9. The method of claim 1 wherein generating a report for the client device is further based upon a report selection by the client device.

10. The method of claim 1 wherein the report includes a chart with an overlay graph.

11. A server system, including a processor, for receiving and processing manufacturing data from a plurality of semi-conductor manufacturers, comprising:
a file capture module for receiving the manufacturing data from the plurality of semi-conductor manufacturers;
the manufacturing data including test data;
the test data indicating electrical characteristics;
a format conversion module coupled to the file capture module, the format conversion module converting the manufacturing data to a standard database format for storage in a database;
a query builder module coupled to a client web browser for interactively changing contents of the client web browser depending upon a plurality of client selections on the client web browser, the query builder module configured to build a final query based on the plurality of client selections;
a limit checker and alert module configured to check a predetermined limit of at least some of the test data of the manufacturing data stored in the database;
the predetermined limit being a user defined limit for a parameter associated with the electrical characteristics, the parameter being for threshold voltage; and
a report generation module coupled to the database and the query builder module, the report generation module generating a report based on the final query.

12. The server system of claim 11 further comprising:
a scheduler module configured to schedule times when the manufacturing data is to be retrieved from one or more manufacturers of the plurality of semi-conductor manufacturers.

13. The server system of claim 12 wherein the limit checker and alert module is coupled via a network to an email client, the limit checker and alert module further configured to send an email to the email client, when a checked part of the manufacturing data exceeds the predetermined limit.

14. The server system of claim 11 wherein the query builder module builds the final query from client web browser using a plurality of sets of selections, wherein when a first selection is made by the client web browser in a first set of the sets of selections, a second set of the sets of selections has a displayed set of selections on the client web browser limited to selections associated with the first selection.

15. The server system of claim 14 wherein the plurality of sets of selections comprises: a fabrication set, a family set, a device set, and a lot set.

16. The server system of claim 15 wherein the fabrication set and the family set have a many-to-many relationship.

17. The server system of claim 16 wherein a family of the family set and corresponding device set form a parent-child relationship, respectively and a device of the device set and corresponding lot set form another parent-child relationship, respectively.

18. A computer program stored in a computer readable storage medium, the computer program comprising;
code for capturing files from a plurality of manufacturers having programmable logic device ("PLD") manufacturing data;
the PLD manufacturing data including test data;
the test data indicating electrical characteristics;
code for converting the files into a standard format for storage in a database;
code for building a query from a client web browser using a plurality of sets of selections, wherein when a first selection is made by the client device in a first set of the sets of selections, a second set of the sets of selections has a displayed set of selections on the web browser limited to selections associated with the first selection;
code for generating a report for the client web browser based on the built query and the converted files stored in the database;
code for checking limits of the PLD manufacturing data by accessing the database;
code for comparing the test data of the PLD manufacturing data stored in the database with limits therefor, the limits being user defined limits including a parameter limit associated with the electrical characteristics, the parameter limit being for threshold voltage; and
code for alerting the client device, when any stored PLD manufacturing data exceeds the limits during the comparing.

* * * * *